United States Patent [19]

Terrill et al.

[11] Patent Number: 5,138,017
[45] Date of Patent: Aug. 11, 1992

[54] MOISTURE CURABLE POLYURETHANE COATING

[75] Inventors: Randy W. Terrill; Leland R. Miller, both of Niles, Mich.

[73] Assignee: Niles Chemical Paint Co., Niles, Mich.

[21] Appl. No.: 709,286

[22] Filed: Jun. 3, 1981

[51] Int. Cl.$^5$ ............................................. C08G 18/10
[52] U.S. Cl. ..................................... 528/59; 525/437
[58] Field of Search .......................... 528/59; 525/437

[56] References Cited

U.S. PATENT DOCUMENTS 4,304,706 12/1981 Urs ........................................ 524/88

Primary Examiner—Maurice J. Welsh
Attorney, Agent, or Firm—Thomas J. Dodd

[57] ABSTRACT

A single component moisture curable polyurethane coating and the process for making the same. The process includes mixing a polymeric isocyanate compound to a mixture containing a polyol and pigments. The resulting water-free composite is stored in a moisture-free environment until use is desired.

20 Claims, No Drawings

MOISTURE CURABLE POLYURETHANE COATING

FIELD OF THE INVENTION

This invention relates to coatings, and has special application to a pigmented, single-component, moisture curable polyurethane.

BACKGROUND OF THE INVENTION

Pigmented moisture curable coatings have been in use for at least the last 25 years. These coatings fall mainly into two distinct groups. Single component coatings are those which are shipped in a ready-to-use condition and which must be maintained in a substantially moisture free environment to prevent premature curing. Two component coatings are shipped in separate packages and require the user to mix the components just prior to use.

The main problem with the two component systems has always been the on-site mixing. Improper ratios of components when mixed often renders the coating inefficient or at times useless.

In an effort to overcome user error, one component systems were introduced, beginning with the coating described and claimed in U.S. Pat. No. 3,479,325, which disclosed the mixing of a monomeric isocyanate compound with a polymeric compound containing free —OH groups, then adding a polyisocyanate solution to remove residual water. The main problem with the one component systems was and still is the necessity of strict controls in the mixing of the reagents. Other problems involve the length of time needed to produce a batch of coating and limited shelf life.

U.S. Pat. No. 4,304,706 discloses a method for producing one-component coatings which involves a controlled three-step process. As disclosed in this patent, a measured amount of a monomeric diisocyanate and a polyol are mixed in a pigment dispersion so that excess unreacted —OH groups are present. The resulting dispersion is then mixed with enough of a polyisocyanate to consume these —OH groups and to leave an excess of free —CNO groups to react with moisture when the coating is to be used. This process speeds up production time, but still requires strict controls in a multiple step process to produce an efficient and usable coating.

Other patents which disclose polyurethane coatings and methods of manufacture are found in the accompanying prior art sheet.

SUMMARY OF THE INVENTION

This invention involves a process for manufacturing a moisture curable polyurethane coating which further reduces production time and also produces a more color stable coating of increased shelf life. The process is also safer than previous methods in that the use of a monomeric isocyanate as a moisture scavenger has been eliminated. As noted in U.S. Pat. No. 4,304,706, monomeric isocyanates are toxic and cause eye and respiratory damage. By eliminating these types of compounds, the process of this invention is eminently safer.

The process involves mixing a polymeric isocyanate to a pigment dispersion which includes an incorporated compound having free —OH groups. The process is carried out at elevated temperatures to enhance the reaction. Certain additives and catalysts may be present in the pigment dispersion to enhance the physical properties of the resulting coating. The coating produced by this process is a single component, pigmented polyurethane which cures upon contact with moisture.

DESCRIPTION OF THE PREFERRED EMBODIMENT

The preferred embodiment herein disclosed is not intended to be exhaustive nor to limit the invention to the precise form disclosed. It was chosen and described to explain the principles of the invention and its application and practical use to enable others skilled in the art to follow its teachings.

The single component, moisture curable polyurethane coating of this invention is essentially formed by a two step process, although in the preferred mode described below, several substeps are contemplated to help achieve an optimum end result.

The basic process involves the mixing of a pigment solution with a compound which contains free —OH groups at slightly elevated temperatures, usually in the presence of property enhancing additives. This mixture is then combined with a polymeric isocyanate compound which reacts with the free —OH groups to form a moisture free spreadable polyurethane coating. The polymeric isocyanate added will preferably consume all of the free —OH groups and leave a number of unreacted isocyanate groups which are free to react with airborne moisture to cure the coating when use is desired. The general chemistry surrounding these reactions has been known since the late 1930's.

Production of single component, pigmented, moisture curable polyurethanes was heretofore believed to require either the use of expensive pigment drying equipment. Alternatively, as disclosed in U.S. Pat. No. 4,304,706, the use of a monomeric isocyanate moisture scavenger prior to the addition of the polyisocyanate. The process of this invention eliminates both the drying equipment and the potential health risks involved with the use of isocyanate monomers.

The preferred —OH compound mentioned above is taken from the classes of compounds known as polyols, polyesters, and polyethers. Most preferred is from between 1%–40% by weight of a saturated polyester resin having a hydroxyl number of 41–47 referred to as DESMOPHEN 1700, sold by Mobay Corporation of Pittsburgh, PA.

Some additives which may be used in the process include one or more of the following: polyester/polyamine copolymers, fumed silicon dioxide, organoclay reological additives, wetting and dispersing agents, and catalysts such as dibutyltin dilaurate. Preferred solvents include MAK and equivalents, and the pigments may be custom matched depending upon the color, gloss, and permanency desired. The preferred polyisocyanates are from 10%–70% by weight and are manufactured by Mobay Corporation under the DESMODUR trade name series, most preferably those which include trimers and biurets of hexamethylene diisocyanate (DES N-3390 and N-100).

The exact quantities of ingredients used will vary based upon the type of coating desired. The following example illustrates the manufacture of one such coating which will have particular value in coating armed services vehicles and equipment with a matte finish camouflage pattern. The example also illustrates the substeps used to produce an optimum product and are in no way limitative of the basic process.

EXAMPLE 36 pounds of SOLSPERSE ® 24,000, a polyester/polyamine copolymer manufactured by ICI Americas, Inc. is dissolved in 615.6 pounds (90.53 gallons) of MAK solvent. The following ingredients were added to this mixture: 60 pounds of DESMOPHEN-1700, 299.8 pounds of a green hiding pigment, 100 pounds of a tan hiding pigment, 3.30 pounds of a hiding pigment, 13.40 pounds of fumed silicon dioxide, 30 pounds of an organoclay additive, and 8.6 pounds of a dispersing/wetting agent. This mixture was ground in a conventional mill for approximately 2 hours.

To this mixture was slowly added 952.5 pounds of extender pigments 493.5 pounds of MAK and 271.8 pounds of a hiding pigment. This mixture is ground in the mill during addition and allowed to drain into a holding tank. 202.6 pounds of DESMOPHEN 1700, 2.6 pounds of dibutyltin dilaurate and 2.6 pounds of MAK were added to the holding tank mixture and heated to about 140° F., under an inert blanket cover at which time 547 pounds of DESMODUR N-100 and 620.35 pounds of DESMODUR N-3390 were added with stirring. The resulting mixture was maintained at the 140° F. temperature for about 1 hour then drained into sealed moisture proof drums.

The polyurethane coating formed by the above process can be stored in the sealed containers until use is desired. It should be noted that the quantities of ingredients listed can be altered depending upon the type of coating desired. So long as the polyisocyanate is added in sufficient quantities to leave unreacted —CNO groups in the finished product, a useful moisture-curable polyurethane results. Also, the heating temperatures can be varied from about 90° F.–190° F. as desired. The amount and type of pigments added to the mixture depend on the desired color, gloss, and uniformity desired usually from 2–70% by weight. All pigments, solvents, and additives are selected from commercially available sources.

It is understood that this invention is not limited by the above details, but may be modified within the scope of the following claims.

We claim:

1. A process for manufacturing a one-component moisture curable polyurethane comprising the steps of:
   a) providing a quantity of a polymeric compound which has unreacted hydroxyl groups;
   b) mixing said polymeric compound with a quantity of a pigment dispersion to form a pigment mixture;
   c) heating said pigment mixture to at least 90° F.; and
   d) adding a sufficient quantity of a polymeric isocyanate compound to said pigment mixture wherein all of said unreacted hydroxyl groups are consumed, and excess free isocyanate groups exist.

2. The process of claim 1 wherein step c) involves heating said pigment mixture to at least 140° F.

3. The process of claim 1 wherein said pigment dispersion also includes a dispersing/wetting agent.

4. The process of claim 1 wherein said pigment dispersion also includes a polyester/polyamine copolymer solution.

5. The process of claim 1 wherein said pigment dispersion includes 0–100% hiding pigments and from 0–100% extender pigments.

6. The process of claim 1 wherein said pigment dispersion includes a reaction catalyst.

7. The process of claim 1 wherein said polymeric compound is selected from the group of materials which includes polyols, polyesters and polyethers.

8. The process of claim 7 wherein said polymeric isocyanate includes a trimer or a biuret of hexamethylene diisocyanate.

9. The process of claim 1 wherein said pigment mixture is ground in a mill prior to heating.

10. A one-component moisture curable polyurethane coating comprising a mixture of a heated pigment dispersion and a polymeric isocyanate compound, said pigment dispersion including from two percent to 70 percent by weight of pigments and from one percent to 40 percent by weight of a compound having excess unreacted hydroxyl groups and from zero percent to 60 percent by weight of dispersing solvent, said pigment dispersion substantially free from monomeric isocyanate compounds, said polymeric isocyanate including excess isocyanate groups sufficient to consume all of said unreacted hydroxyl groups and to leave an excess of unreacted isocyanate.

11. The coating of claim 10 wherein said heated pigment dispersion is at a temperature of at least 90° F.

12. The coating of claim 10 wherein said heated pigment dispersion is at a temperature of at least 140° F.

13. The coating of claim 10 wherein said pigment dispersion also includes a dispersing/wetting agent.

14. The coating of claim 10 wherein said pigment dispersion also includes a polyester/polyamine copolymer solution.

15. The coating of claim 10 wherein said pigment dispersion includes 0–100% hiding pigments and from 0–100% extender pigments.

16. The coating of claim 10 wherein said pigment dispersion includes a reaction catalyst.

17. The coating of claim 10 wherein said polymeric compound is selected from the group of materials which includes polyols, polyesters and polyethers.

18. The coating of claim 17 wherein said polymeric isocyanate includes a trimer or a biuret of hexamethylene diisocyanate.

19. The process of claim 1 wherein said pigment dispersion is substantially free of monomeric isocyanate compounds.

20. The process of claim 1 wherein said pigment dispersion is substantially free of isocyanate compounds.

* * * * *